(12) United States Patent
Born et al.

(10) Patent No.: US 6,518,346 B1
(45) Date of Patent: Feb. 11, 2003

(54) CATALYSTS FOR PRODUCING COLD OR HOT CROSS-LINKABLE MASSES

(75) Inventors: Peter Born, Sandhausen (DE); Uwe Weinbrecht, Mannheim (DE); Dieter Guhl, Speyer (DE)

(73) Assignees: Henkel Teroson GmbH, Heidelberg (DE); Th. Goldschmidt. AG, Essen (DE)

( * ) Notice: Subject to any disclaimer, the term of this patent is extended or adjusted under 35 U.S.C. 154(b) by 0 days.

(21) Appl. No.: 09/701,100

(22) PCT Filed: May 14, 1999

(86) PCT No.: PCT/EP99/03333

§ 371 (c)(1),
(2), (4) Date: Jun. 12, 2001

(87) PCT Pub. No.: WO99/61515

PCT Pub. Date: Dec. 2, 1999

(30) Foreign Application Priority Data

May 23, 1998 (DE) .......................................... 198 23 184

(51) Int. Cl.⁷ ................................................. C08K 5/04

(52) U.S. Cl. .......................................... 524/394; 524/81
(58) Field of Search ..................... 524/81, 394

(56) References Cited

U.S. PATENT DOCUMENTS

| | | | | |
|---|---|---|---|---|
| 3,624,014 A | | 11/1971 | Moore et al. | 260/18 S |
| 4,604,420 A | | 8/1986 | Sato | 524/394 |
| 4,760,882 A | * | 8/1988 | Novak | 166/295 |
| 5,684,089 A | | 11/1997 | Lanoye et al. | 525/237 |

FOREIGN PATENT DOCUMENTS

| | | |
|---|---|---|
| CA | 1248271 | 7/1992 |
| EP | 0 181 441 | 5/1986 |
| EP | 0 356 715 | 3/1990 |
| GB | 1083090 | 9/1967 |

* cited by examiner

*Primary Examiner*—Edward J. Cain
(74) *Attorney, Agent, or Firm*—Stephen D. Harper

(57) ABSTRACT

The cross-linking of cross-linkable compositions containing hydroxyl-bearing and carboxylate-bearing addition polymers of 1,3-butadiene is achieved using catalysts containing alkali metal salts of carboxylic acids.

26 Claims, No Drawings

CATALYSTS FOR PRODUCING COLD OR HOT CROSS-LINKABLE MASSES

The invention relates to catalysts for preparing cold- or hot-crosslinkable compositions.

Hot- and cold-crosslinkable compositions are prior art and their use as joint sealing compounds, adhesives, putties and filling compositions is known. Normally, compositions for said applications comprise a combination of functionalized binders, crosslinking agent and catalyst for accelerating the crosslinking reaction. In addition, modifiers may be added, such as fillers, plasticizers, dyes and the like.

Known, for example, are hydroxyl-terminated addition polymers which are crosslinked with diisocyanates as crosslinking agents and with a customary catalyst. Alternatively, a tetraalkyl silicate may be used as crosslinking agent, in which case tin(II) octoate is used as catalyst (U.S. Pat. No. 3,624,014).

EP 0 356 715 B1 relates to liquid or spreadable, vulcanizable rubber mixtures based on a plurality of polymers of which at least one is olefinically unsaturated, said mixtures comprising from 30 to 70 parts by weight of a polymer A containing on average at least 2 hydroxyl groups per macromolecule from 70 to 30 parts by weight of an A-compatible polymer B containing on average at least 2 carboxylic acid and/or carboxylic anhydride groups or at least one carboxylic acid and one carboxylic anhydride group per molecule from 10 to 120 parts by weight of vulcanizing assistants and, if desired, fillers and/or auxiliaries, and if desired, from 0.1 to 5 parts by weight of esterification catalysts, at least one of the polymers A or B being vulcanizable under customary reaction conditions at elevated temperatures by way of its olefinic double bonds, and only one of the components A or B deriving from a vulcanizable polydiene, the other component constituting, however, a polyamide which is compatible therewith, a polyester or an addition copolymer, in each case containing OH and/or carboxylic acid or carboxylic anhydride groups, or the polymers A and B deriving from polydienes or copolymers thereof.

EP 0 181 441 A1 describes a hot-crosslinkable composition and also a process for preparing a cold-crosslinking composition, consisting of a combination of two functionalized binders whose cold crosslinking is induced by addition of a catalyst. Binder I comprises an addition polymer based on a homobutadiene which has been appropriately functionalized with hydroxyl groups. Binder II is likewise an addition polymer based on a homo- or co-butadiene, which is provided, for example, with succinic anhydride groups. The polymers may be variously modified. For the actual crosslinking reaction, however, it is only the reaction of the hydroxyl groups with the acid anhydride group which is of importance. All other modifications serve in the widest sense to modify the product properties.

EP 0 181 441 A1 teaches that the cold crosslinking of such compositions may be catalyzed with preference by nitrogenous catalysts or sulfonic acids.

Nitrogenous catalysts described include, for example: pyridine, N-methylimidazole, 3-amino-2,4-dimethylpentane, di(2-ethylhexyl)amine. An example given of an appropriate sulfonic acid is p-toluenesulfonic acid.

The aforementioned compositions are employed, inter alia, in heat-curing adhesives for metal parts or for structural components which in the course of their processing are further subjected to heat treatment steps. The prior art catalysts have disadvantages for these applications. If metal parts are to be bonded by means of such compositions, the sulfonic acid, even in catalytic amounts, leads to an increased rate of corrosion at the areas wetted and thus to a reduced stability. Admittedly, this disadvantage can be circumvented by using amines. If, however, heat treatment is necessary in the subsequent course of processing, the amines too have disadvantages. At the amounts necessary for cold crosslinking (approximately 1% based on the overall amount of binder), elevated temperature is accompanied by evaporation of the volatile amine compounds and thus by a considerable odor nuisance in the course of processing.

It is an object of the present invention to provide a catalyst whose catalytic activity is similar to that of the known compounds but which is not corrosive toward metal parts and which does not lead to any odor nuisance in use.

The aforementioned object is achieved by means of catalysts for crosslinking cold- and/or hot-crosslinking compositions, comprising alkali metal salts of straight-chain or branched, saturated, mono- or polyunsaturated, aliphatic and/or aromatic carboxylic acids of natural and/or synthetic origin.

A starting point for achieving the proposed objective was the consideration that carboxylates might be suitable substances for catalyzing the reaction between an anhydride function and an alcohol function on the basis of their known catalytic activity in esterification reactions. In general, esterification reactions are conducted at temperatures above room temperature, which depending on ester type may range from approximately 80° C. up to 280° C. A catalysis at room temperature, on the other hand, is not known.

All alkali metal salts of aliphatic and aromatic carboxylic acids of synthetic or natural origin are suitable, including in each case alkyl- and/or aryl-substituted compounds and also mixtures thereof. Particular preference is given to those salts which are compatible with the polymer matrix and may be incorporated homogeneously, which is the case in particular for aliphatic carboxylic acid residues with a chain length from $C_3$ to $C_{22}$. Where necessary, the salts may also be used in the form of a solution in an inert solvent. Compounds of this kind are not corrosive toward customary metals and their alloys. Moreover, they are substantially odorless and have such a low volatility that even on exposure to heat they do not result in any odor-intensive evaporation from the polymer.

When test sheets of standard steel are coated with a composition comprising alkali metal carboxylate-crosslinked compositions and are stored for several hours at 80° C. with exposure to atmospheric humidity, it is possible to ascertain neither any odor nuisance nor incipient corrosion of the metal sheets, as is observed, for example, under the catalytic effect of free acid.

The catalytic activity of the crosslinking reaction at room temperature between the hydroxy-functional polymer and the anhydride-functional polymer may be regulated by the concentration of alkali metal carboxylate that is used. For the target processing time of approximately 1 hour before the formation of a composition which is no longer flowable and is not tacky on the surface, a concentration of from 0.5 to 2.0 parts per 100 parts of polymer mixture, preferably from 0.7 to 1.5 parts, is sufficient. To achieve the same profile of properties, the amines or sulfonic acids known from the prior art are likewise used in a concentration of approximately 1 part per 100 parts of polymer mixture.

The suitability of alkali metal carboxylates for the use in accordance with the invention is surprising insofar as comparable carboxylates of polyvalent metal ions, such as those of zinc, of calcium or of bismuth, for example, do not exhibit sufficient catalytic activity at room temperature.

The following examples demonstrate the activity of the alkali metal carboxylates in accordance with the invention, in comparison to other substances.

EXAMPLES

Example 1

In a coated paper cup, the following components are intimately mixed at room temperature for 2 minutes using a mizer disk:

50.0 g of maleic acid adduct of a low molecular mass 1,4-cis-polybutadiene having an average molecular mass of from 1800 to 2400 and an acid number of from 80 to 95 mg KOH/g with 50.0 g of polybutadienol having an OH number of 0.83 meq/g, and 1.0 g of potassium 2-ethylhexanoate, dissolved in diethylene glycol dimethyl ether.

The mixture is poured out onto a substrate and tested for its hardening at 20° C. after one hour.

After one hour, the composition has the following properties:

tack-free surface, no flowability, no stringing.

Examples 2 to 6

In analogy to Example 1, the following components are mixed:

50.0 g of maleic acid adduct of 1,4-cis-polybutadiene, 50.0 g of polybutadienol, and 1.0 g of catalyst (as in Table 1).

The results are set out in Table 1.

TABLE 1

| Example No. | Catalyst | Properties of surface | Flowability | Stringing |
|---|---|---|---|---|
| 2 | potassium 2-ethylhexanoate | tack-free | none | none |
| 3 | potassium n-octanoate | tack-free | none | none |
| 4 | potassium isooctoate | tack-free | none | none |
| 5 | potassium neodecanoate | tack-free | none | none |
| 6 | sodium isooctoate | tack-free | none | very slight |

Comparative Examples 1 to 6

In analogy to Example 1, the catalysts are varied. The results are set out in Table 2.

TABLE 2

| Comparative Example | Catalyst | Properties of surface | Flowability | Stringing |
|---|---|---|---|---|
| 1 | Dioctylamine | tack-free | none | none |
| 2 | p-toluene-sulfonic acid | tack-free | none | none |
| 3 | N,N,N',N'-tetra-methylenediamine | tack-free | none | none |
| 4 | zinc 2-ethylhexanoate | tacky | low viscosity | yes |
| 5 | Calcium octoate | tacky | low viscosity | yes |
| 6 | Bismuth neodecanoate | tacky | low viscosity | yes |

What is claimed is:

1. A crosslinkable composition comprising:
   (a) one or more hydroxyl-bearing addition polymers based on 1,3-butadiene, said hydroxyl-bearing addition polymers bearing hydroxyl groups selected from the group consisting of primary hydroxyl groups, secondary hydroxyl groups, and combinations thereof;
   (b) one or more carboxylate-bearing addition polymers based on 1,3-butadiene, said carboxylate-bearing addition polymers bearing carboxylate groups selected from the group consisting of anhydride groups, carboxylic acid groups, and combinations thereof; and
   (c) one or more catalysts selected from the group consisting of alkali metal salts of carboxylic acids.

2. The crosslinkable composition of claim 1 additionally comprising at least one additive selected from the group consisting of fillers, inert solvents, plasticizers and dyes.

3. The crosslinkable composition of claim 1 wherein said crosslinkable composition comprises at least one sodium or potassium salt of a carboxylic acid.

4. The crosslinkable composition of claim 1 wherein said crosslinkable composition comprises at least one alkali metal salt of a carboxylic acid bearing from 4 to 22 carbon atoms.

5. The crosslinkable composition of claim 1 wherein said crosslinkable composition comprises from 0.5 to 2.0 parts by weight of (c) per 100 parts by weight of (a)+(b).

6. The crosslinkable composition of claim 1 wherein said crosslinkable composition comprises at least one alkali metal salt of an aliphatic carboxylic acid.

7. The crosslinkable composition of claim 1 wherein said crosslinkable composition comprises at least one alkali metal salt of a saturated aliphatic carboxylic acid.

8. The crosslinkable composition of claim 1 wherein said crosslinkable composition comprises at least one maleic acid adduct of 1,4-cis-polybutadiene.

9. The crosslinkable composition of claim 1 wherein said crosslinkable composition comprises at least one polybutadienol.

10. A crosslinkable composition comprising:
    (a) one or more hydroxyl-bearing addition polymers based on 1,3-butadiene, said hydroxyl-bearing addition polymers bearing hydroxyl groups selected from the group consisting of primary hydroxyl groups, secondary hydroxyl groups and combinations thereof; and
    (b) one or more carboxylate-bearing addition polymers based on 1,3-butadiene, said carboxylate-bearing addition polymers bearing carboxyl groups selected from the group consisting of carboxylic acid groups, anhydride groups and combinations thereof; and
    (c) one or more catalysts selected from the group consisting of sodium and potassium salts of saturated aliphatic carboxylic acids bearing from 4 to 22 carbon atoms;

wherein said crosslinkable composition comprises from 0.5 to 2.0 parts by weight of (c) per 100 parts by weight of (a)+(b).

11. The crosslinkable composition of claim 10 wherein said crosslinkable composition comprises 0.7 to 1.5 parts by weight of (c) per 100 parts by weight of (a)+(b).

12. The crosslinkable composition of claim 10 wherein at least one catalyst is selected from the group consisting of potassium 2-hexanoate, potassium n-octanoate, potassium isooctoate, potassium neodecanoate and sodium isooctoate.

13. The crosslinkable composition of claim 10 additionally comprising at least one additive selected from the group consisting of fillers, plasticizers, inert solvents and dyes.

14. The crosslinkable composition of claim 10 wherein said crosslinkable composition comprises at least one maleic acid adduct of 1,4-cis-polybutadiene.

15. The crosslinkable composition of claim 10 wherein said crosslinkable composition comprises at least one polybutadienol.

16. A method of crosslinking a composition comprised of:
(a) one or more hydroxyl-bearing addition polymers based on 1,3-butadiene, said hydroxyl-bearing addition polymers bearing hydroxyl groups selected from the group consisting of primary hydroxyl groups, secondary hydroxyl groups and combinations thereof; and
(b) one or more carboxylate-bearing addition polymers based on 1,3-butadiene, said carboxylate-bearing addition polymers bearing carboxyl groups selected from the group consisting of carboxylic acid groups, anhydride groups and combinations thereof;

said method comprising mixing said composition with one or more catalysts selected from the group consisting of alkali metal salts of carboxylic acids.

17. The method of claim 16 wherein said composition is additionally comprised of at least one additive selected from the group consisting of fillers, inert solvents, plastcizers and dyes.

18. The method of claim 16 wherein at least one catalyst is a sodium or potassium salt of a carboxylic acid.

19. The method of claim 16 wherein at least one catalyst is an alkali metal salt of a carboxylic acid bearing from 4 to 22 carbon atoms.

20. The method of claim 16 wherein from 0.5 to 2.0 parts by weight of the catalyst per 100 parts by weight of (a)+(b) is employed.

21. The method of claim 16 where at least one catalyst is an alkali metal salt of an aliphatic carboxylic acid.

22. The method of claim 16 wherein at least one catalyst is an alkali metal salt of a saturated aliphatic carboxylic acid.

23. The method of claim 16 wherein said crosslinking is carried at about room temperature.

24. The method of claim 16 wherein said composition comprises at least one maleic acid adduct of 1,4-cis polybutadiene.

25. The method of claim 16 wherein said composition comprises at least one polybutadienol.

26. A crosslinkable composition produced by the method of claim 16.

* * * * *